US009066091B2

(12) United States Patent  
Chen

(10) Patent No.: US 9,066,091 B2  
(45) Date of Patent: Jun. 23, 2015

(54) THREE-DIMENSIONAL DISPLAY SYSTEM, DISPLAY AND METHOD OF CONTROLLING BACKLIGHT OF THREE-DIMENSIONAL DISPLAY

(75) Inventor: Shih-Ping Chen, Taoyuan County (TW)

(73) Assignee: BenQ Corporation, Taipei (TW)

( * ) Notice: Subject to any disclaimer, the term of this patent is extended or adjusted under 35 U.S.C. 154(b) by 738 days.

(21) Appl. No.: 13/164,849

(22) Filed: Jun. 21, 2011

(65) Prior Publication Data

US 2011/0316850 A1    Dec. 29, 2011

(30) Foreign Application Priority Data

Jun. 23, 2010  (TW) .............................. 099120400 A

(51) Int. Cl.  
*H04N 13/04* (2006.01)  
*G09G 3/00* (2006.01)  
*G09G 3/34* (2006.01)

(52) U.S. Cl.  
CPC ....... *H04N 13/0429* (2013.01); *H04N 13/0497* (2013.01); *H04N 13/0438* (2013.01); *G09G 3/3406* (2013.01); *G09G 3/003* (2013.01); *G09G 2320/0633* (2013.01); *G09G 2320/064* (2013.01); *G09G 2320/0646* (2013.01); *G09G 2360/141* (2013.01); *G09G 2360/145* (2013.01)

(58) Field of Classification Search  
CPC ............... G09G 3/3406; G09G 3/36; G09G 2320/0646; G09G 3/3648; G09G 2360/16; G09G 2320/064; G09G 3/3426; G09G 2320/0233; G09G 2330/021  
USPC ......... 345/87, 102, 8, 207, 495; 348/51, E13, 348/E13.02, 59, 56, 43  
See application file for complete search history.

(56) References Cited

U.S. PATENT DOCUMENTS

| 4,562,463 | A | 12/1985 | Lipton |
| 4,884,876 | A | 12/1989 | Lipton et al. |
| 5,717,415 | A | 2/1998 | Iue et al. |
| 2006/0170644 | A1* | 8/2006 | Ioki et al. ...................... 345/102 |
| 2006/0221270 | A1* | 10/2006 | Ioki et al. ........................ 349/61 |
| 2008/0316303 | A1* | 12/2008 | Chiu et al. ...................... 348/51 |
| 2009/0146944 | A1* | 6/2009 | Kirk .............................. 345/102 |
| 2009/0179850 | A1 | 7/2009 | Chen et al. |
| 2010/0238274 | A1* | 9/2010 | Kim et al. ....................... 348/51 |

(Continued)

FOREIGN PATENT DOCUMENTS

| TW | 200931065 | 7/2009 |
| TW | 200931065 A | 7/2009 |

OTHER PUBLICATIONS

Office Action of counterpart application by Taiwan IP Office on Sep. 17, 2013.

*Primary Examiner* — Olga Merkoulova

(57) ABSTRACT

A three-dimensional display system including a display and a pair of three-dimensional glasses having a light sensor is provided. The display includes a backlight driving module and a backlight module, wherein the backlight driving module modulates an original synchronization signal to generate a modulated backlight driving signal for driving the backlight module to generate a backlight. The display alternatively generates a left eye image and a right eye image according to a three-dimensional image signal. The three-dimensional glasses then determines whether the image output from the display is the let-eye image or the right-eye image based on the variation in brightness of the backlight generated by the backlight module of the display.

20 Claims, 14 Drawing Sheets

(56) References Cited

U.S. PATENT DOCUMENTS

2011/0018983 A1* 1/2011 Kim et al. .................... 348/56
2011/0096084 A1* 4/2011 Hu et al. ..................... 345/589
2013/0002835 A1* 1/2013 Winer ........................... 348/56

* cited by examiner

THREE-DIMENSIONAL DISPLAY SYSTEM, DISPLAY AND METHOD OF CONTROLLING BACKLIGHT OF THREE-DIMENSIONAL DISPLAY

BACKGROUND OF THE INVENTION

1. Field of the Invention

This invention relates to a display system, a display thereof, and a method of controlling the backlight module of the display, more specifically to a three-dimensional display system, a three-dimensional display thereof, and a method of controlling the backlight module of the three-dimensional display system.

2. Description of the Prior Art

In order to provide viewers with more realistic visual experience, more and more three-dimensional displays have emerged in the market. Here please refer to the conventional three-dimensional display system 10 in FIG. 1. As FIG. 1 shows, the conventional three-dimensional display system 10 includes a display 20, a computer 30, and a pair of liquid crystal shutter glasses 40, wherein a signal connection is established between the display 20 and the computer 30 in order for the computer 30 to transmit three-dimensional image signals to the display 20. The display 20 then separates the three-dimensional image signals into left-eye-image signals and right-eye-image signals and then alternatively generates left eye images and right eye images based on those signals.

As FIG. 1 shows, the display 20 has a synchronization signal transmitter 21 and the liquid crystal shutter glasses 40 has a synchronization signal receiver 41, wherein the synchronization signal transmitter 21 generates infrared lights based on the synchronization signal from the computer 30. In other words, the synchronization signal transmitter 21 transforms the synchronization signal into infrared lights. The synchronization signal receiver 41 is used to receive the infrared lights and determines whether the image now provided by the display 20 is a left eye image or a right eye image In this way, the open/close status of the left eye shutter 42 and the right eye shutter 43 of the liquid crystal shutter glasses 40 can be accordingly controlled based on the determination of the synchronization signal receiver 41.

That is, the liquid crystal shutter glasses 40 senses the synchronization signal from the synchronization signal transmitter 21 and then determines whether the image provided by the display 20 is a left eye image or a right eye image based on the sensed synchronization signal. The liquid crystal shutter glasses 40 opens the left eye shutter 42 and closes the right eye shutter 43 when the display 20 is providing the left eye image. Similarly, the liquid crystal shutter glasses 40 closes the left eye shutter 42 and opens the right eye shutter 43 when the display 20 is providing the right eye image. In this way, the liquid crystal shutter glasses 40 allows the viewer's left eye and right eye to receive left eye image and right eye image exclusively so that the viewer can have a complete three-dimensional visual experience.

However, the use of the synchronization signal transmitter 21 and the synchronization signal receiver 41 will increase the overall cost of the conventional three-dimensional display system 10 and reduce its competiveness on the market. Furthermore, the relative distance between the synchronization signal transmitter 21 and the synchronization signal receiver 41 needs to be fixed in order to maintain the stability in the transmission of the synchronization signal. However, the distance between the two devices is often constantly changing as the viewer moves. This constant change in distance may reduce the power of the infrared lights to such an extent that the synchronization signal receiver 41 cannot establish a proper synchronization with the synchronization signal transmitter 21 of the display 20.

Consequently, the liquid crystal shutter glasses 40 will incorrectly open and close the liquid crystal shutters due to incorrect synchronization and this prevents the viewer from enjoying the three-dimensional visual effect.

SUMMARY OF THE INVENTION

It is an objective of the present invention to provide a three-dimensional display system at lower cost.

It is another objective of the present invention to provide a three-dimensional display system that can synchronize with the three-dimensional glasses by means of backlight and a method of controlling the backlight module of the three-dimensional display system.

The three-dimensional display system of the present invention includes a display and a pair of three-dimensional glasses. The display is connected to a computer or any other electronic device to receive a three-dimensional image signal and an original synchronization signal. The display includes a user setting circuit, a coding module, a backlight driving module, and a backlight module. The user setting circuit generates an original backlight driving signal based on user's setting. The coding module is used to generate a modulated synchronization signal based on the original synchronization signal. The backlight driving module adds the modulated synchronization signal to the original backlight driving signal to generate a modulated backlight driving signal for driving the backlight module to generate a backlight, wherein the brightness of backlight varies in accordance with a variation of the modulated backlight driving signal.

The modulated synchronization signal of the present invention is a pulse signal. In other words, the coding module generates a plurality of pulse signals based on the original synchronization signal. The modulated backlight driving signal generated by the backlight driving module has a plurality of signal troughs corresponding to different time slots of the modulated synchronization signal. In this way, the brightness of the backlight varies in accordance with "the numbers of" or "locations of" the signal troughs of the modulated synchronization signal.

The display panel of the display will alternatively generate a left eye image and a right eye image based on the three-dimensional image signal and the backlight generated by the backlight module. The light sensor of the three-dimensional glasses determines whether a left eye image or a right eye image is received by the light sensor based on the variation in brightness of the backlight. The pair of three-dimensional glasses then correspondingly opens or closes the left eye shutter and the right eye shutter of the three-dimensional glasses.

As mentioned above, the display of the present invention synchronizes with the three-dimensional glasses by means of backlights generated by the backlight module. In this way, the three-dimensional display system does not need additional devices for transmitting and receiving the synchronization signal (e.g. the infrared lights). Furthermore, compared to the use of conventional infrared transmitter and receiver, the backlight generated by the backlight module can establish a more stable synchronization with the three-dimensional glasses and provide better quality when the viewer enjoys the three-dimensional images.

DETAILED DESCRIPTION OF THE PREFERRED EMBODIMENT

This invention relates to a display system, a display thereof, and a method of controlling the backlight module of the display, more specifically to a three-dimensional display system, a three-dimensional display thereof, and a method of controlling the backlight module of the three-dimensional display.

Figure 1:
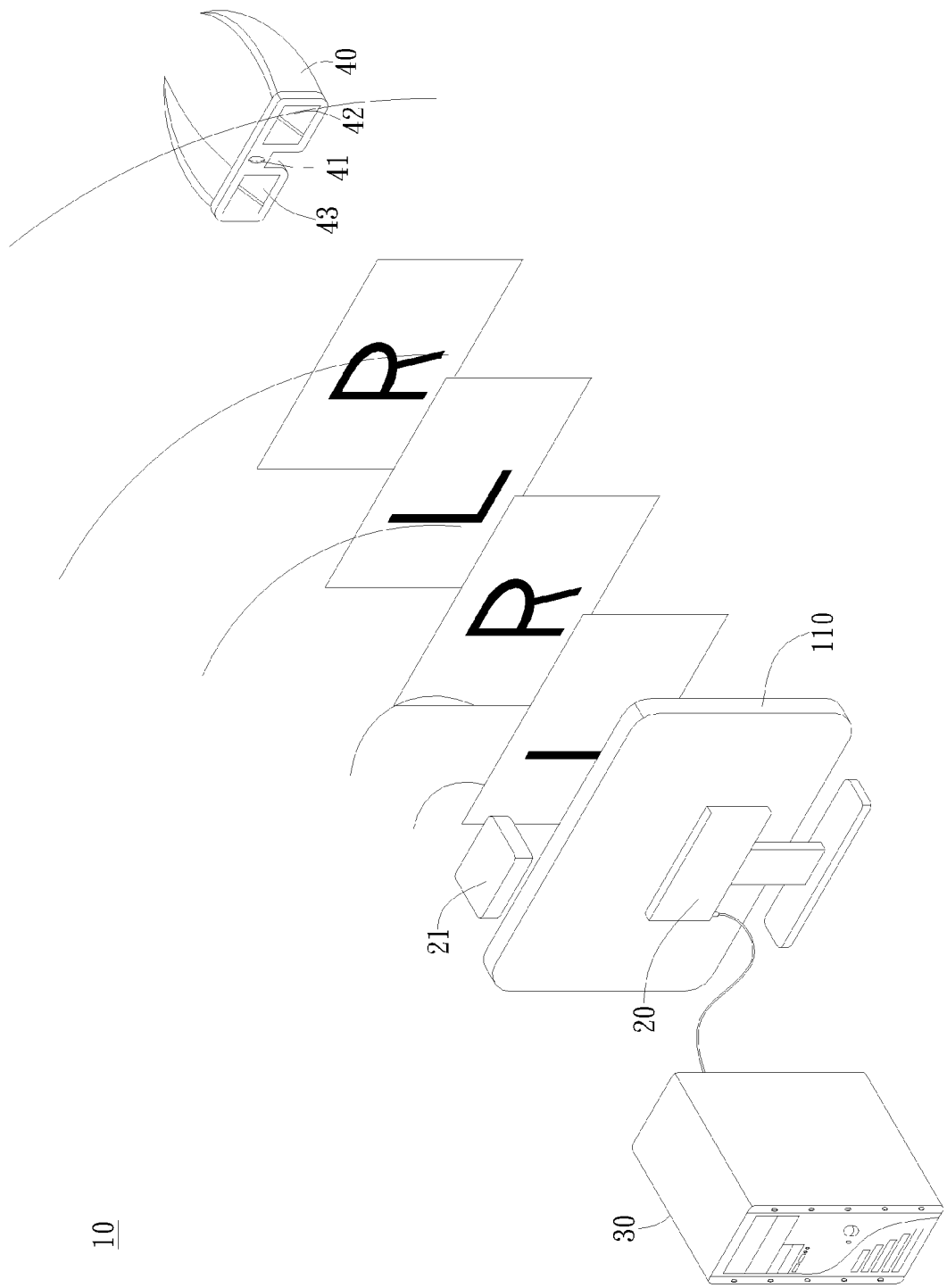
FIG. 1 is a schematic view of a conventional display system.
Figure 2A:
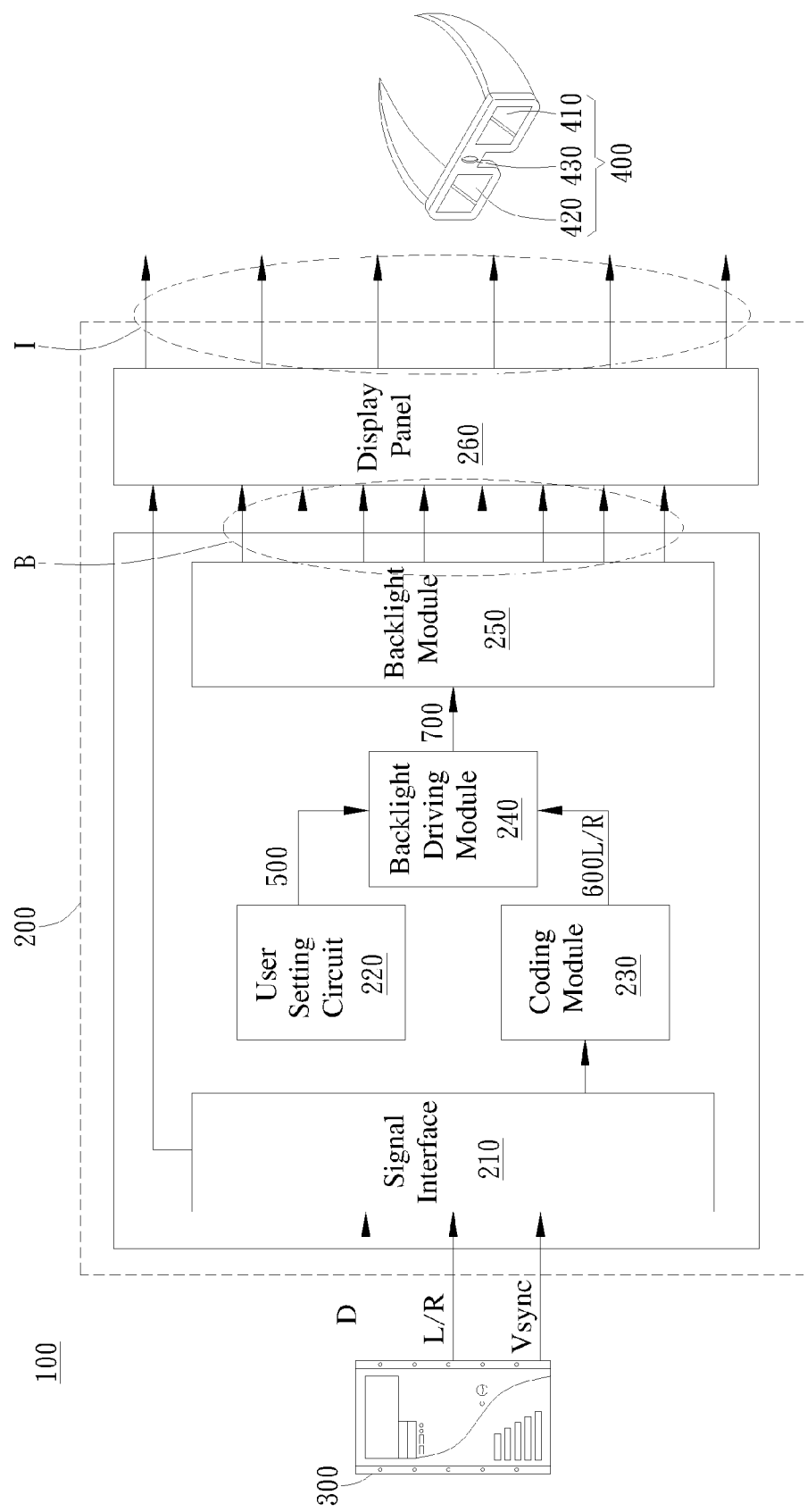
FIG. 2A is a schematic view of the three-dimensional display system of the present invention.

FIG. 2A is a schematic view of the three-dimensional display system 100 of the present invention, wherein the three-dimensional display system 100 of the present embodiment includes a display 200 and a three-dimensional glasses 400, wherein the three-dimensional glasses 400 has a light sensor 430. In the present embodiment, the display 200 receives a three-dimensional image signal D, an original synchronization signal L/R, and a vertical synchronization signal Vsync from an external source. The display 200 generates a three-dimensional image I based on the above mentioned signals, wherein the three-dimensional image I includes a left eye image and a right eye image alternatively displayed at different time slots. As FIG. 2A shows, the display 200 is preferably electrically connected to a computer 300 in order to receive the three-dimensional image signal D, the original synchronization signal L/R, and the vertical synchronization signal Vsync, but is not limited thereto. The display 200 can be electrically connected to an electronic storage reader such as a blu-ray drive or any other electronic devices that can provide the three-dimensional image signal D, the original synchronization signal L/R, and the vertical synchronization signal Vsync. In different embodiments, the display 200 can include a hard drive or any other electronic storage devices that can be used to store the three-dimensional image signal D.

In the embodiment illustrated in FIG. 2A, the three-dimensional glasses 400 has a left eye shutter 410 and a right eye shutter 420 for receiving the three-dimensional image I. When the user wears the three-dimensional glasses 400, by closing the right eye shutter 420 and opening the left eye shutter 410 when the display 200 displays a left eye image and by closing the left eye shutter 410 and opening the right eye shutter 420 when the display 200 displays a right eye image, the viewer can enjoy the desired three-dimensional visual effect. The display 200 of the present embodiment synchronizes with the three-dimensional glasses 400 by means of a backlight B, which is generated by the backlight module 250 in the display 200 and changes in brightness. In other words, the light sensor 430 of the three-dimensional glasses 400 determines whether a left eye image or a right eye image are received by the light sensor 430 based on the change in brightness of the backlight B. In the present embodiment, the left eye shutter 410 and the right eye shutter 420 both include liquid crystal, so that the light sensor 430 can close or open the left eye shutter 410 and the right eye shutter 420 by controlling the twist of liquid crystals after the image outputted by the display 200 is determined as a right eye image or as a left eye image.

As FIG. 2A shows, the display 200 includes a signal interface 210, a user setting circuit 220, a coding module 230, a backlight driving module 240, a backlight module 250, and a display panel 260. The signal interface 210 of the present embodiment is electrically connected to the computer 300 to receive the three-dimensional image signal D, the original synchronization signal L/R, and the vertical synchronization signal Vsync. The signal interface 210 then transmits the three-dimensional image signal D and the original synchronization signal L/R to the coding module 230 and the display panel 260. The vertical synchronization signal Vsync notifies the display 200 of the beginning of a respective display period of the left eye image and the right eye image while the original synchronization signal L/R notifies the display 200 of the outputted image being the left eye image or the right eye image. The display panel 260 will receive the three-dimensional image signal D and alternatively generate the left eye image and the right eye image in different time slots.

In the embodiments illustrated in FIG. 3A-FIG. 5, the user setting circuit 220 generates an original backlight driving signal 500 in a form of a continuous current signal, wherein the brightness of the backlight B generated by the backlight module 250 is relative to the change in amplitude of the original backlight driving signal 500, i.e. the magnitude of current of the original backlight driving signal 500. The original backlight driving signal 500 has a default current magnitude set by the manufacturer, but the user can adjust the current magnitude of the original backlight driving signal 500 through the user setting circuit 500 so as to adjust the brightness of the backlight B.

Figure 6:
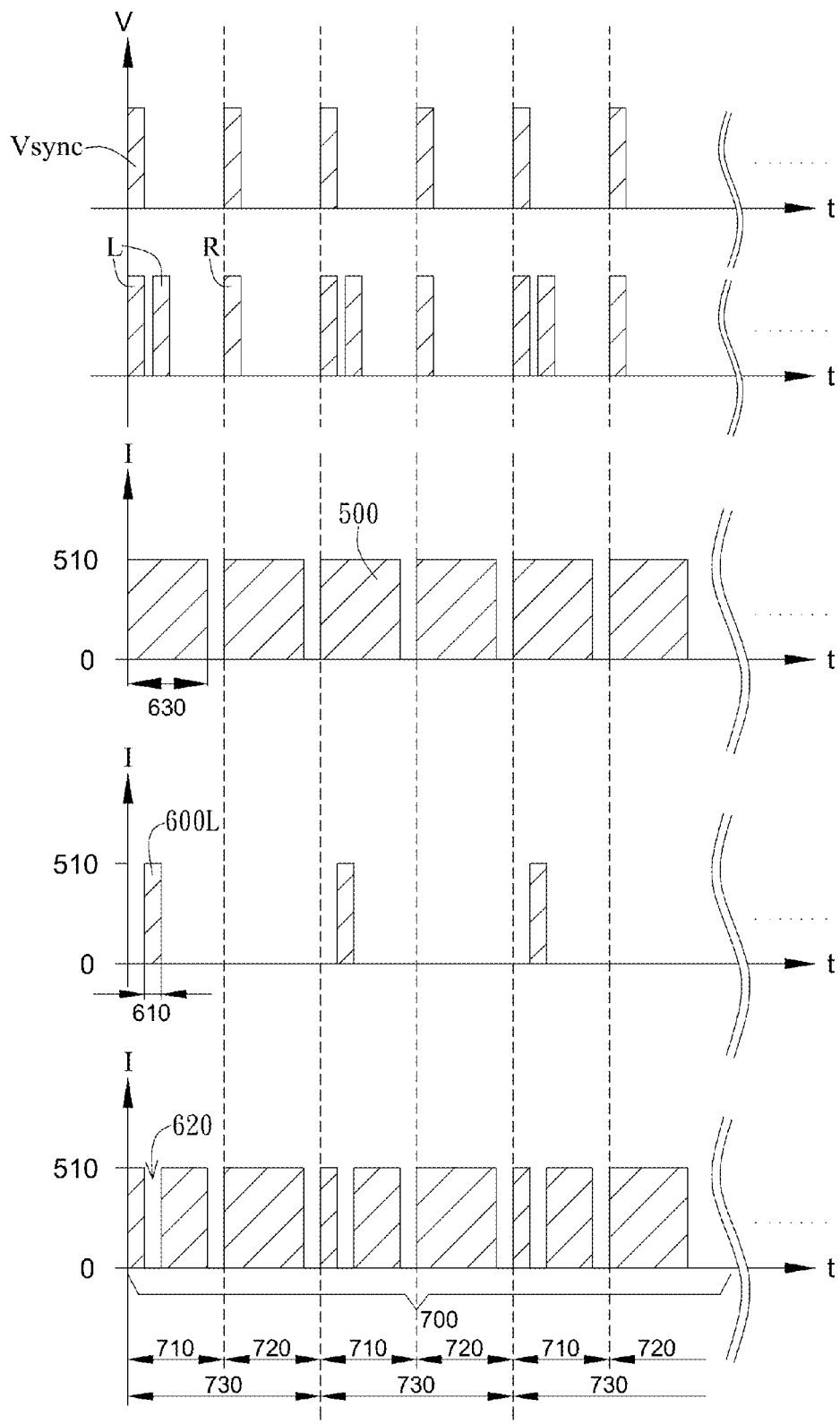
Figure 7:
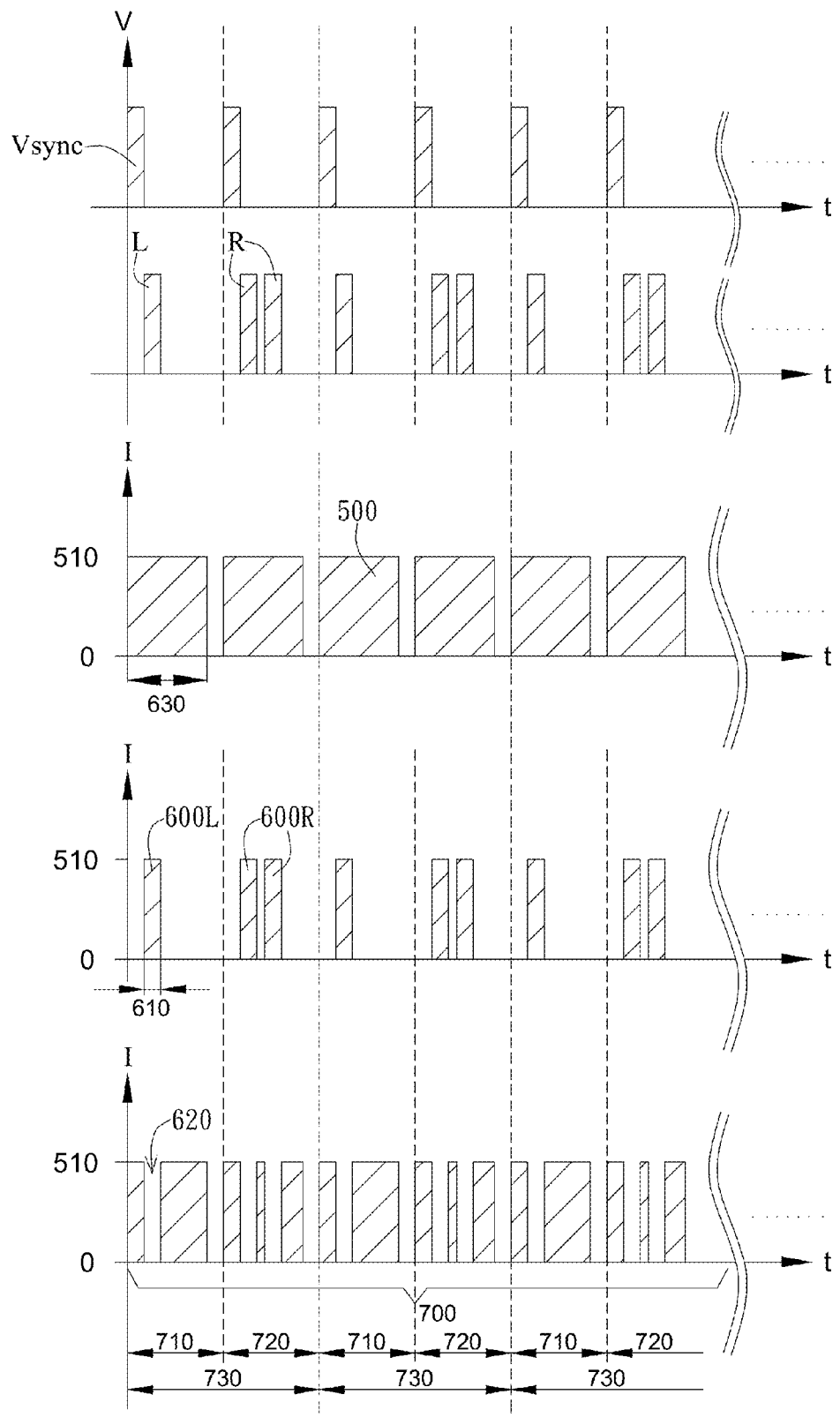

In the embodiments illustrated in FIG. 6 and FIG. 7, the user setting circuit 220 generates the original backlight driving signal 500 in a form of pulse current signal having a plurality of electrical pulse signals, wherein the average brightness of the backlight B generated by the backlight module 250 to the human eyes is relative to the amplitude and to the duration of each pulse. The original backlight driving signal 500 has a default pulse duration set by the manufacturer, wherein the user can adjust the pulse duration of the original backlight driving signal 500 through the user setting circuit 220 so as to adjust the brightness of the backlight B.

Therefore, the original backlight driving signal 500 can be a continuous current signal with adjustable current magnitude or an electrical pulse signal with adjustable pulse duration.

The coding module 230 illustrated in FIG. 2A is electrically connected to the signal interface 210 and the backlight driving module 240. The coding module 230 receives the vertical synchronization signal Vsync and the original synchronization signal L/R from the computer 300 through the signal interface 210. The coding module 230 then generates a modulated synchronization signal 600L/R based on the original synchronization signal L/R, wherein the modulated synchronization signal 600L corresponds to a display period 710 for left eye image (i.e. left-eye-image display period 710), and the modulated synchronization signal 600R corresponds to a display period 720 for right eye image (i.e. right-eye-image display period 720). The modulated synchronization signal 600L or 600R is a pulse signal. In other words, the coding module 230 generates a plurality of direct current pulse signals based on the original synchronization signal L/R, but is not limited thereto.

In the present embodiment, the coding module 230 is used to generate the modulated synchronization signal 600L or 600R based on the original synchronization signal L/R, but is not limited thereto. In the embodiments illustrated in FIGS. 4 and 7, if the original synchronization signal L/R provided by the computer 300 is already a suitable pulse signal, then the three-dimensional display system 100 can directly use the original synchronization signal L/R as the modulated synchronization signal 600L or 600R and thus eliminate the coding procedure mentioned above.

In the embodiments illustrated in FIG. 3A to FIG. 7, the vertical synchronization signal Vsync determines the beginning of the left-eye-image display period 710 and the right-eye-image display period 720. The modulated synchronization signal 600L/600R is used to determine the image generated by the display 200 to be left eye image or right eye image.

The backlight driving module 240 receives the original backlight driving signal 500 generated by the user setting circuit 220 and one of the modulated synchronization signal 600L or 600R generated by the coding module 230. In the embodiments illustrated in FIG. 3A to 7, the backlight driving module 240 then generates a modulated backlight driving signal 700 by subtracting the modulated synchronization signal 600L/600R from the original backlight driving signal 500. In other words, the current magnitude of the modulated backlight driving signal 700 is the difference in current magnitude between the original backlight driving signal 500 and the modulated synchronization signal 600L/600R, but is not limited thereto. In different embodiments, the backlight driving module 240 can generate the modulated backlight driving signal 700 by adding the modulated synchronization signal 600L/600R to the original backlight driving signal 500.

In the embodiment illustrated in FIG. 2A, the backlight module 250 receives the modulated backlight driving signal 700 from the backlight driving module 240 and generates the backlight B based on the modulated backlight driving signal 700. As shown in FIG. 3A to FIG. 5, the brightness of backlight B is relative to the amplitude of the modulated backlight driving signal 700. The light sensor 430 of the three-dimensional glasses 400 determines whether the modulated synchronization signal 600L/600R is present at a specific display period. Based on the variation in brightness of backlight B, the light sensor 430 then determines whether the left eye image or the right eye image is currently provided by the display panel 260.

Figure 2B:
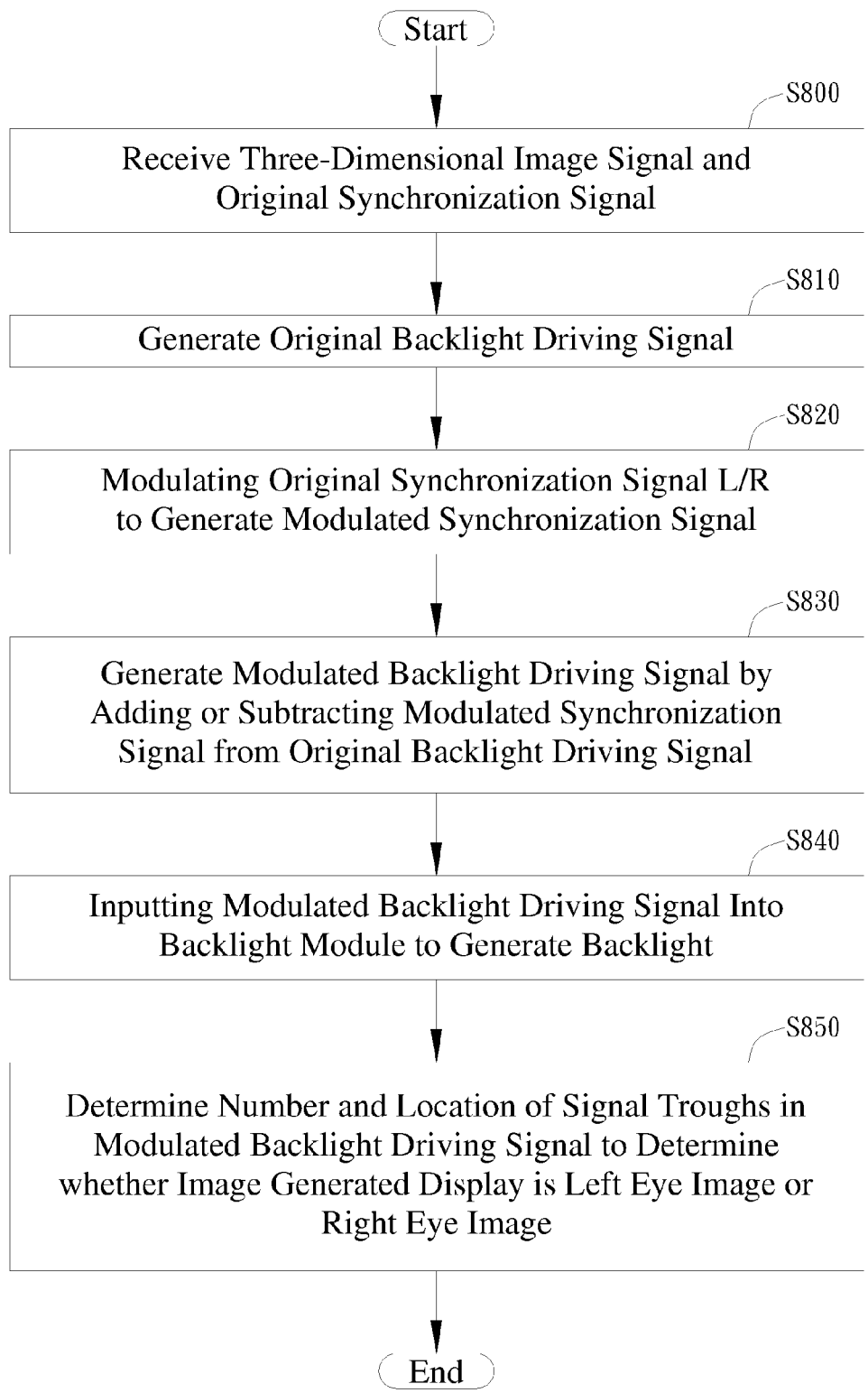
FIG. 2B is a flow chart illustrating the method of controlling the backlight module of the three-dimensional display illustrated in FIG. 2A.

FIG. 2B is a flow chart illustrating the method of controlling the backlight module of the three-dimensional display of the present invention. As FIG. 2B shows, the method includes step S800 of receiving a three-dimensional image signal D. For example, the method includes the display 200 for receiving the three-dimensional image signal D and the original synchronization signal L/R from the computer 300, but is not limited thereto. The display 200 can receive the three-dimensional image signal D and the original synchronization signals L/R from other electronic devices such as a blu-ray multimedia player. The display 200 then alternatively generates a left-eye-image signal and a right-eye-image signal at different time slots for the display panel 260 to alternatively generate the left eye image 740 or the right eye image 750. For example, the display panel 260 of the display 200 alternatively provides left eye images and right eye images at different time slots. The backlight module 250 of the display 200 changes the brightness of the backlight B based on the modulated backlight driving signal 700 which is affected by the original synchronization signal L/R. The change in brightness of the backlight B allows the three-dimensional glasses 400 to determine whether the left eye image 740 or the right eye image 750 is received by the light sensor 430.

The method of controlling the backlight module further includes step S810 of generating an original backlight driving signal 500 for use in driving the backlight module 250 to generate the backlight B with corresponding brightness. In the present embodiment, the display 200 includes a user setting circuit 220 for generating the original backlight driving signal 500, wherein the user setting circuit 220 includes a user setting value which is used as a reference for the user setting circuit 220 to generate the original backlight driving signal 500 in default amplitude when the display 200 is powered on. However, the user can selectively adjust the user setting value in the user setting circuit 220 after the display 200 is powered on to adjust the amplitude of the original backlight driving signal 500 and the brightness of the backlight B.

The method of controlling the backlight module further includes step S820 of modulating the original synchronization signal L/R to generate a modulated synchronization signal 600L/600R and step S830 of generating a modulated backlight driving signal 700 based on the modulated synchronization signal 600L/600R and the original backlight driving signal 500. For example, the modulated backlight driving signal 700 is generated by adding the modulated synchronization signal 600L/600R to the original backlight driving signal 500, or subtracting the modulated synchronization signal 600L/600R from the original backlight driving signal 500. In the present embodiment, the display 200 includes a coding module 230 and a backlight driving module 240, wherein in step 820, the coding module 230 is configured to modulate the original synchronization signal L/R received from the computer 300 to generate the modulated synchronization signal 600L/600R. The backlight driving module 240 is configured to generate the modulated backlight driving signal 700 for driving the backlight module 250, wherein the modulated backlight driving signal 700 is generated by adding the modulated synchronization signal 600L/600R to the original backlight driving signal 500, or subtracting the modulated synchronization signal 600L/600R from the original backlight driving signal 500.

In the present embodiment, the coding module 230 is used to generate the modulated synchronization signal 600L during the time period that the display 200 generates the left eye image and to generate the modulated synchronization signal 600R during the time period that the display 200 generates the right eye image, wherein the modulated backlight driving signal 700 is in a form of a pulse signal. For example, the original backlight driving signal 500 subtracts the modulated synchronization signal 600L/600R by the backlight driving module 240 to generate the modulated backlight driving signal 700, so that the modulated backlight driving signal 700 has a plurality of signal troughs 620, but is not limited thereto. In different embodiments, the backlight driving module 240 can generate the modulated backlight driving signal 700 by adding the modulated synchronization signal 600L/600R to the original backlight driving signal 500. The location and the width of the signal trough 620 and the modulated synchronization signal 600L/600R have substantially the same width and location in terms of time. Furthermore, in the present embodiment, the original backlight driving signal 500 is a direct current voltage, but is not limited thereto. In different embodiments, the original backlight driving signal 500 can be any suitable voltage pulses according to the driving manner the backlight module 250.

In one embodiment, the coding module 230 generates only the modulated synchronization signal 600L in the display period for left eye image, but is not limited thereto. The coding module 230 can selectively generate only the modulated synchronization signal 600R in the display period for right eye image. In different embodiments, the coding module 230 can generate both modulated synchronization signals 600L, 600R in time slots that are spaced apart.

The method of controlling the backlight module of the three-dimensional display of the present invention includes step S840 of inputting the modulated backlight driving signal 700 generated by the backlight driving module 240 into the backlight module 250 to generate the backlight B, so that the display panel 260 of the display 200 can provide left eye images and right eye images based on the three-dimensional image signal D. The brightness of backlight B is relative to the amplitude of the modulated backlight driving signal 700 and therefore the change in brightness of backlight B corresponds to the timing of the signal troughs 620. In the present embodiment, the modulated backlight driving signal 700 has a plurality of signal troughs 620 and therefore the backlight B provided at the timing corresponding to the signal troughs 620 will be reduced. In other words, the brightness of backlight B has the width and location in terms of time corresponding to the signal troughs 620 of the modulated synchronization signal 600L/600R. In step S850, the light sensor 430 of the three-dimensional glasses 400 measures the variation in brightness of the backlight B and then determines the number and locations of signal troughs 620 in the modulated backlight driving signal 700 in order to determine whether the image generated by the display 200 is a left eye image or a right eye image. The sensor 430 then correspondingly controls the open and close status of the left eye shutter 410 and the right eye shutter 420.

Figure 3A:
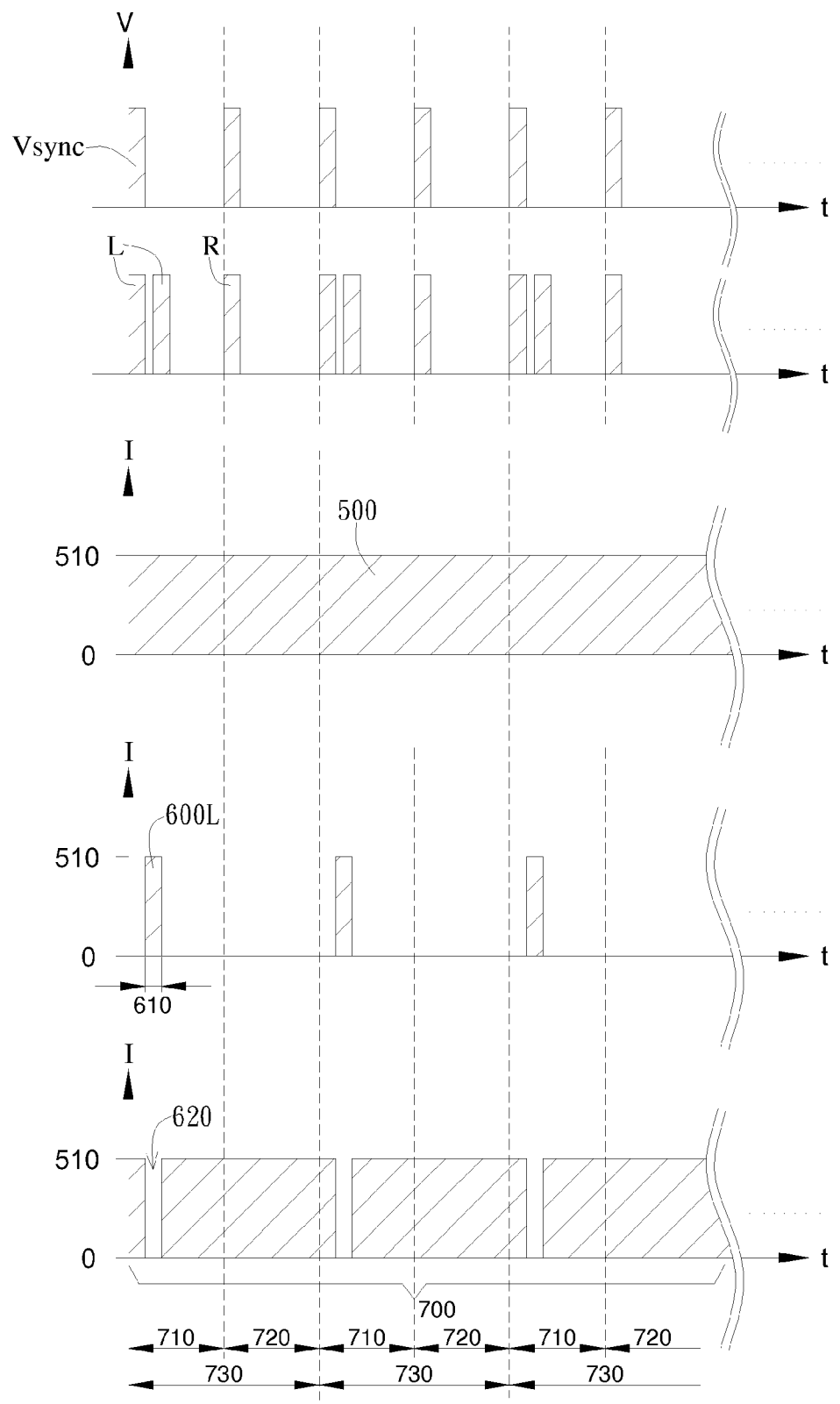
FIG. 3A is a timing diagram illustrating the original backlight driving signal, the modulated synchronization signal, the modulated backlight driving signal during one display period of the three-dimensional display system.

FIG. 3A is a timing diagram illustrating the original backlight driving signal 500, the modulated synchronization signal 600L, the modulated backlight driving signal 700, and a display period 730 of three-dimensional image. As FIG. 3A shows, the original backlight driving signal 500 is a continuous current signal, wherein the original backlight driving signal 500 is a predetermined current 510 adjustable by the user.

As FIG. 3A shows, the original synchronization signal L/R is an electrical pulse, wherein the original synchronization signal L and the original synchronization signal R have different amount of electrical pulses in different time slots. In the present embodiment, the original synchronization signal L/R has different amount of electrical pulses in the left-eye-image display period 710 and the right-eye-image display period 720, but is not limited thereto. In different embodiments, the original synchronization signal L/R can have the same amount of electrical pulse in the left-eye-image display period 710 and the right-eye-image display period 720. Furthermore, the original synchronization signal L/R can be electrical pulses with the same or different amplitude and the same or different width.

The modulated synchronization signal 600L is an electrical pulse signal with a predetermined width 610. In the present embodiment, the amplitude of the predetermined current 510 is substantially identical to the amplitude of the modulated synchronization signal 600L, but is not limited thereto. The amplitude of the modulated synchronization signal 600L is acceptable as long as it can create a brightness trough detectable by the light sensor 430.

The modulated backlight driving signal 700 of the present embodiment is the difference between the original backlight driving signal 500 and the modulated synchronization signal 600L. Therefore the modulated backlight driving signal 700 has a signal trough 620 corresponding to the timing of the modulated synchronization signal 600L, wherein the amplitude of the signal trough 620 is smaller than the amplitude of the predetermined current 510 and the signal trough 620 also has the same predetermined width 610.

As FIG. 3A shows, the left-eye-image display period 710 and the right-eye-image display period 720 are alternatively arranged and form the three-dimensional-image display period 730 based on the vertical synchronization signal Vsync. In the present embodiment, the timing of modulated synchronization signal 600L corresponds to the beginning of the left-eye-image display period 710. In this way, the signal trough 620 of the modulated backlight driving signal 700 corresponds to the beginning of each left-eye-image display period 710. On the other hand, the modulated backlight driving signal 700 has no signal trough in the right-eye-image display period 720.

In this way, when the light sensor 430 detects a change in brightness of the backlight with the predetermined width 610 and the waveform of a pulse, the three-dimensional glasses 400 can then determine that the image generated by the display 200 is a left eye image. The pair of three-dimensional glasses 400 then opens the left eye shutter 410 and closes the right eye shutter 420. On the other hand, the three-dimensional glasses 400 will close the left eye shutter 410 and open the right eye shutter 420 after the duration of the left-eye-image display period 710 until the next brightness trough is detected.

Figure 3B:
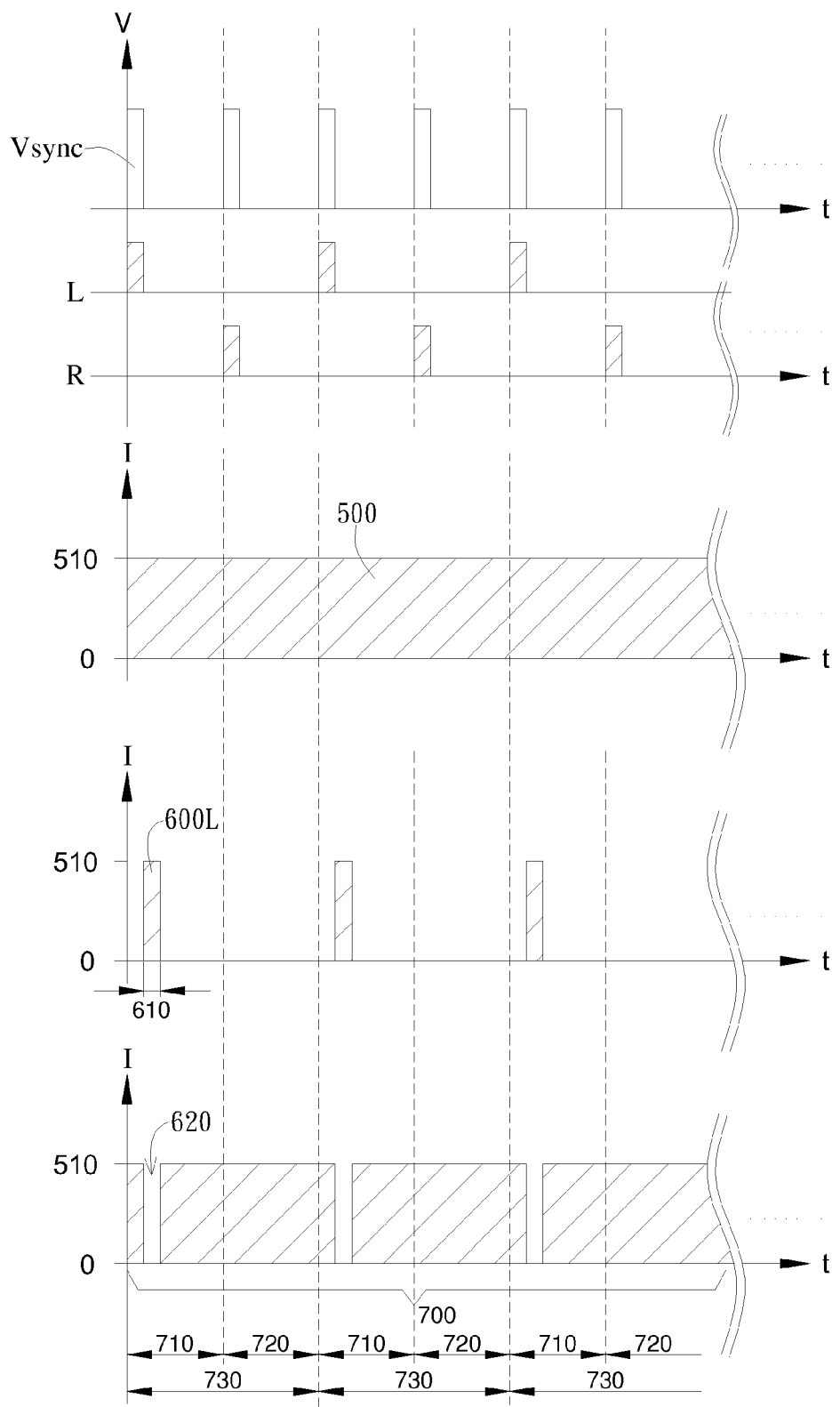
FIG. 3B, FIG. 4, FIG. 5, FIG. 6, and FIG. 7 are variations of the embodiment illustrated in FIG. 3A.

FIG. 3B is another timing diagram illustrating the original backlight driving signal 500, the modulated synchronization signal 600L, the modulated backlight driving signal 700 in display periods 730 of three-dimensional image. In the present embodiment, the original synchronization signal L and the original synchronization signal R are transmitted from different circuitries of the computer 300. Furthermore, the original synchronization signal L/R is an electrical pulse generated in the beginning of the left-eye-image display period 710 and the right-eye-image display period 720. The coding module 230 generates the modulated synchronization signal 600L based on the original synchronization signal L/R, wherein the modulated synchronization signal 600 is provided for the backlight driving module 240 to generate the backlight driving signal 700.

Furthermore, in the embodiment illustrated in FIG. 3B, the original synchronization signal L/R and the modulated synchronization signal 600L have different amplitude and timing, but are not limited thereto; in different embodiments, the original synchronization signals L/R and the modulated synchronization signal 600L can have the same amplitude and timing.

Figure 4:
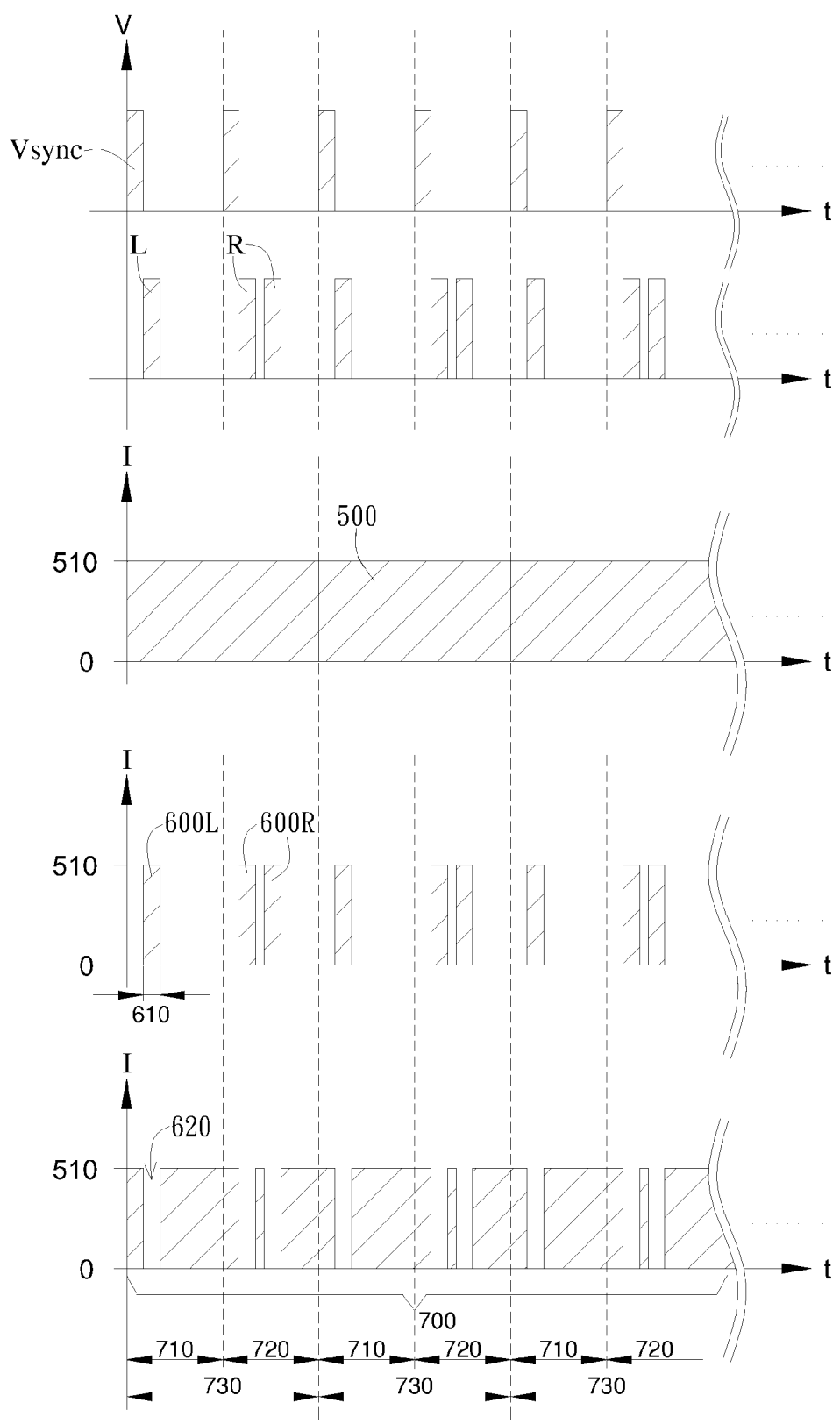

FIG. 4 is a timing diagram illustrating the original backlight driving signal 500, the modulated synchronization signal 600L/600R, and the modulated backlight driving signal 700 in another embodiment. In the present embodiment, the coding module 230 of the display 200 generates different numbers of electrical pulses as the modulated synchronization signals 600L and 600R in the left-eye-image display period 710 and the right-eye-image display period 720, respectively, so that the modulated backlight driving signal 700 has different number of signal troughs 620 in different time periods.

As FIG. 4 shows, the modulated synchronization signal 600L in the left-eye-image display period 710 includes only one electrical pulse while the modulated synchronization signal 600R includes two electrical pulses in the right-eye-image display period 720. In this way, the modulated backlight driving signal 700 have one signal trough 620 at the beginning of the left-eye-image display period 710 and two signal troughs 620 at the beginning of the right-eye-image display period 720. Correspondingly, the backlight B generated by the backlight module 250 will have brightness corresponding to the signal troughs 620 of the modulated backlight driving signal 700. The light sensor 430 thus only needs to detect the one or two numbers of brightness corresponding to the signal trough 620 in the backlight B to determine whether the left eye image 740 or right eye image 750 is generated by the display 200. The three-dimensional glasses 400 will then open and close the left eye shutter 410 and the right eye shutter 420 accordingly.

Figure 5:
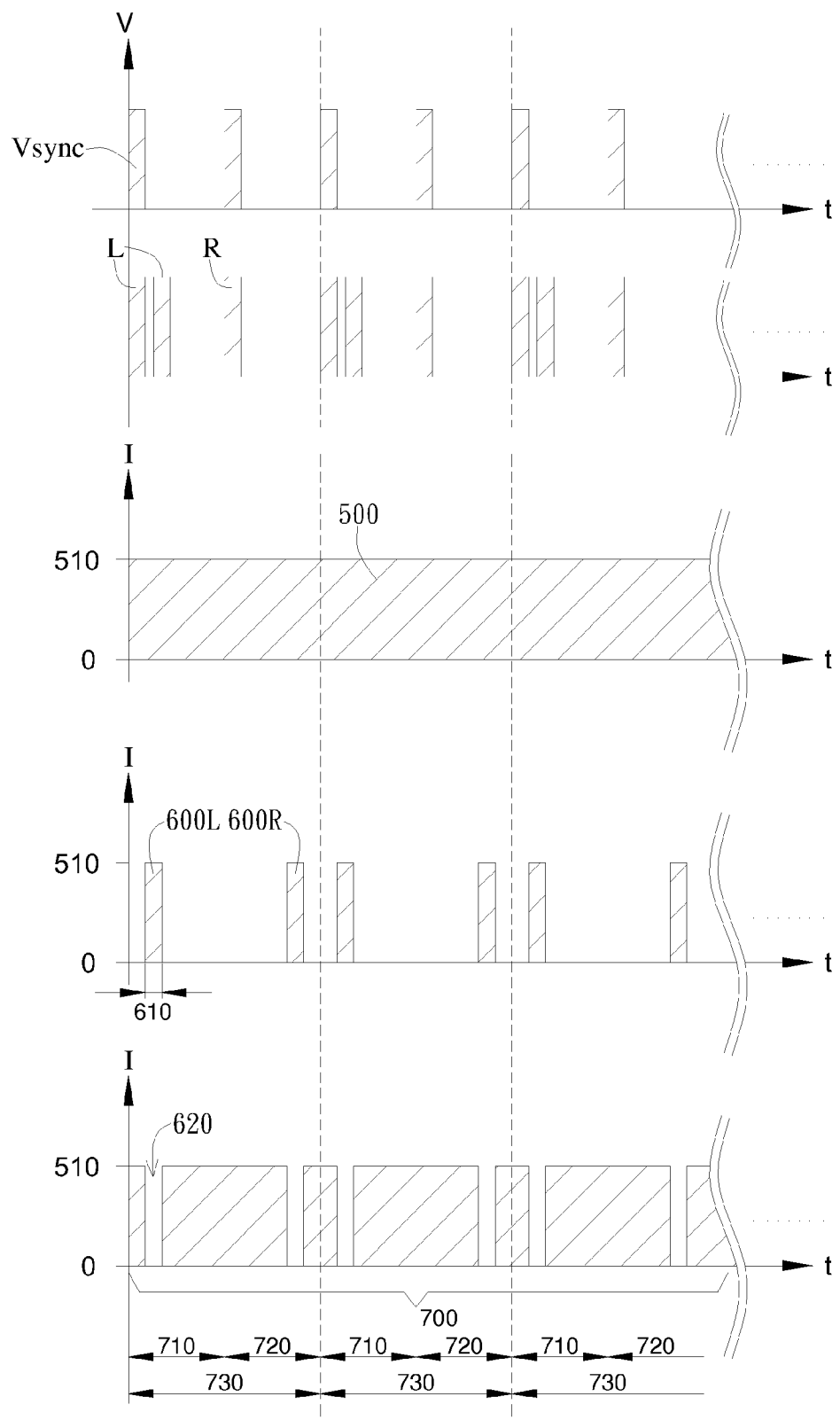

FIG. 5 is a timing diagram illustrating the original backlight driving signal 500, the modulated synchronization signal 600L/600R, and the modulated backlight driving signal 700 in yet another embodiment. In the present embodiment, the left-eye-image display period 710 and the right-eye-image display period 720 have substantially equal width. Here the display 200 change the timing of electrical pulse (as the modulated synchronization signal 600L/600R) presented in the left-eye-image display period 710 and the right-eye-image display period 720, so that the light sensor 430 can distinguish the display periods of the left eye image 740 and the right eye image 750.

As FIG. 5 shows, the modulated synchronization signal 600L/600R has only one electrical pulse in the left-eye-image display period 710 and the right-eye-image display period 720. However, the modulated synchronization signal 600L and the modulated synchronization signal 600R respectively correspond to the substantial beginning of the left-eye-image display period 710 and the substantial end portion of the right-eye-image display period 720. In this way, the time interval between the modulated synchronization signal 600L and a subsequent modulated synchronization signal 600R is greater than the time interval between the modulated synchronization signal 600R and a subsequent modulated synchronization signal 600L. Thus, when the light sensor 430 detects the backlight brightness corresponding to two consecutive electrical pulses and determines that the time interval between the two electrical pulses is greater than a predetermined value in the display period 730 of three-dimensional image, then the electrical pulse later detected will be deemed as the modulated synchronization signal 600L which corresponds to the beginning of the left-eye-image display period 710, and the image currently generated by the display 200 is the left eye image. The three-dimensional glasses 400 will then open the left eye shutter 410 and close the right eye shutter 420 accordingly. The three-dimensional glasses 400 counts time until the left-eye-image display period 710 reaches an end, and then opens the right eye shutter 420 and closes the left eye shutter 410 until next modulated synchronization signal 600L is detected.

FIG. 6 and FIG. 7 illustrate a variation embodiment of the original backlight driving signal 500, the modulated synchronization signal 600L/600R, and the modulated backlight driving signal 700. In the present embodiment, the user setting circuit 220 generates a plurality of pulse signals as the original backlight driving signal 500 for the backlight driving module 240 to generate the modulated backlight driving signal 700, so that the backlight module 250 can be driven to generate the backlight B. The duty cycle of the backlight driving signal 500 in the left-eye-image display period 710 and the right-eye-image display period 720 is substantially 90%. Thus it can be seen that the display 200 of the present embodiment uses a pulse width modulation technique to drive the backlight module 250, and the user setting circuit 220 can be used to adjust the duty cycle of the backlight driving signal 500 and in turn the brightness of the backlight B.

As FIG. 6 shows, the original backlight driving signal 500 is a long pulse signal with a predetermined width 630; the modulated synchronization signal 600L has a predetermined width 610 and is located at the substantial beginning of the left-eye-image display period 710, wherein the predetermined width 630 is greater than the predetermined width 610. In this way, the modulated backlight driving signal 700 has a signal trough 620 at the substantial beginning of the left-eye-image display period 710. The light sensor 430 thus can determine that a left eye image is generated by the display 200 when detecting a brightness corresponding to signal trough 620 in the backlight B at the substantial beginning of the left-eye-image display period 710. The three-dimensional glasses 400 will then open the left eye shutter 410 and close the right eye shutter 420 accordingly. The three-dimensional glasses 400 will close the left eye shutter 410 and open the right eye shutter 420 after the end of the left-eye-image display period 710, wherein the three-dimensional glasses 400 does not perform anything until a next detected brightness corresponding to signal trough 620 representing the next modulated synchronization signal 600L is detected.

FIG. 7 is a timing diagram of the original backlight driving signal 500, the modulated synchronization signal 600L, the modulated backlight driving signal 700 in another embodiment. As FIG. 7 shows, the coding module 230 of the display 200 generates different number of electrical pulses in the left-eye-image display period 710 and the right-eye-image display period 720, respectively. In this way, the modulated backlight driving signal 700 will have different number of signal troughs 620 in the left-eye-image display period 710 and the right-eye-image display period 720 to serve as the modulated synchronization signals 600L and 600R.

In the present embodiment, the modulated backlight driving signal 700 has one signal trough 620 in the left-eye-image display period 710 and two signal troughs 620 in the right-eye-image display period 720. Thus the light sensor 430 only needs to determine the number of brightness corresponding to signal troughs 620 in the backlight B at different time periods to determine whether the left eye image 740 or right eye image 750 is generated by the display 200. The three-dimensional glasses 400 will then open and close the left eye shutter 410 and the right eye shutter 420 accordingly.

In the embodiments illustrated in FIG. 3A, FIG. 3B, FIG. 4, FIG. 5, FIG. 6, and FIG. 7, the modulated synchronization signal 600L/600R is an electrical pulse signal, but is not limited thereto. In different embodiments, the modulated synchronization signal 600L can be chosen from sine wave, square wave, triangular wave, and sawtooth wave whereas the signal trough 620 in the modulated backlight driving signal 700 will have a corresponding shape.

Figure 8A:
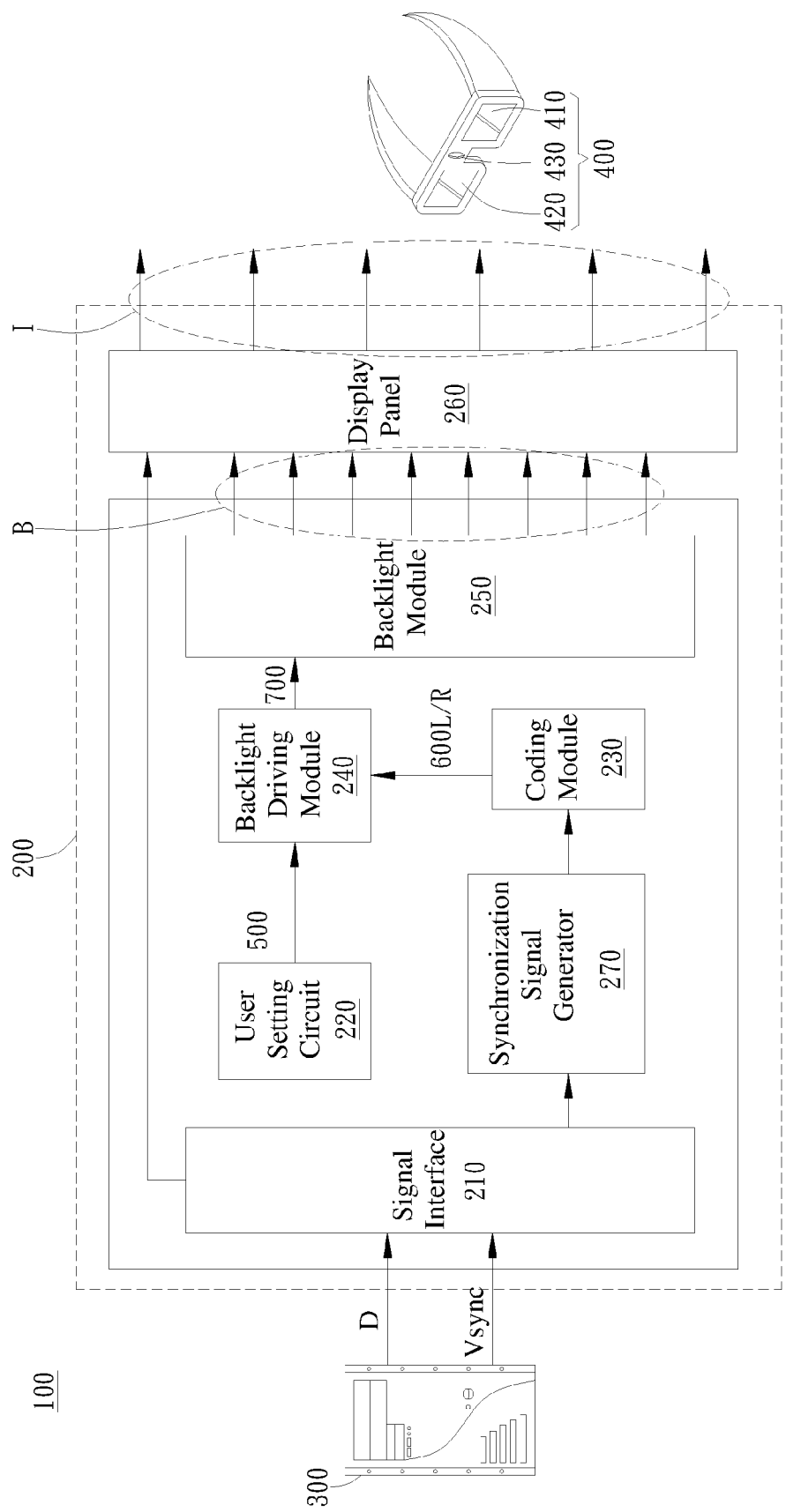
FIG. 8A is a variation embodiment of the three-dimensional display system illustrated in FIG. 2A.

FIG. 8A illustrates a variation embodiment of the three-dimensional display system 100 illustrated in FIG. 2A. In the present embodiment, the amplitude of the original synchronization signal L/R is substantially 0, i.e. the original synchronization signal L/R is not generated by an external source in the present embodiment. In other words, the signal interface 210 receives only the three-dimensional image signal D and the vertical synchronization signal Vsync from the external signal source.

As FIG. 8A shows, the display 200 includes a synchronization signal generator 270 for accepting the three-dimensional image signal D to generate the original synchronization signal L/R based on the left-eye-image signal and the right-eye-image signal included in the three-dimensional image signal D. In this way, the display 200 can synchronize with the three-dimensional glasses 400 even if receiving only the three-dimensional image signal D and the vertical synchronization signal Vsync.

Figure 8B:
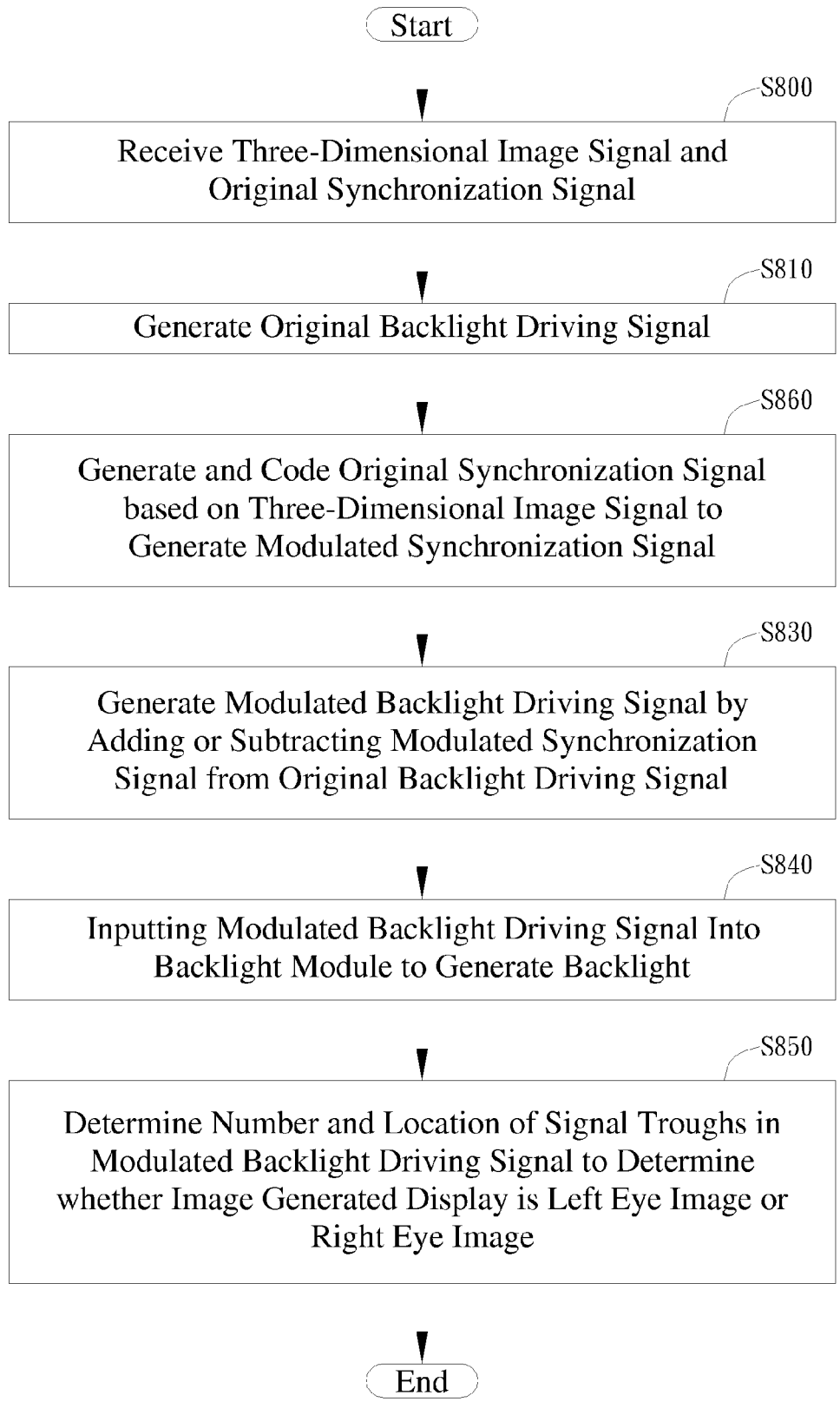
FIG. 8B is a flow chart illustrating the method of controlling the backlight module of the three-dimensional display illustrated in FIG. 8B.

FIG. 8B is a flow chart illustrating the method of controlling the backlight module of the three-dimensional display in FIG. 8A. As FIG. 8B shows, the method includes step S860 of generating the original synchronization signal L/R based on the three-dimensional image signal D and coding the original synchronization signal L/R to generate the modulated synchronization signal 600L/600R. In the present embodiment, the display 200 receives only the three-dimensional image signal D and the vertical synchronization signal Vsync. In order to synchronize with the three-dimensional glasses 400, the synchronization signal generator 270 generates the original synchronization signal L/R based on the three-dimensional image signal D, so that a subsequent module can generate a modulated backlight driving signal 700. Other than the method of generating the original synchronization signal L/R, the method in FIG. 2B and that the method in FIG. 8B are substantially the same and thus will not be elaborated here.

Figure 9:
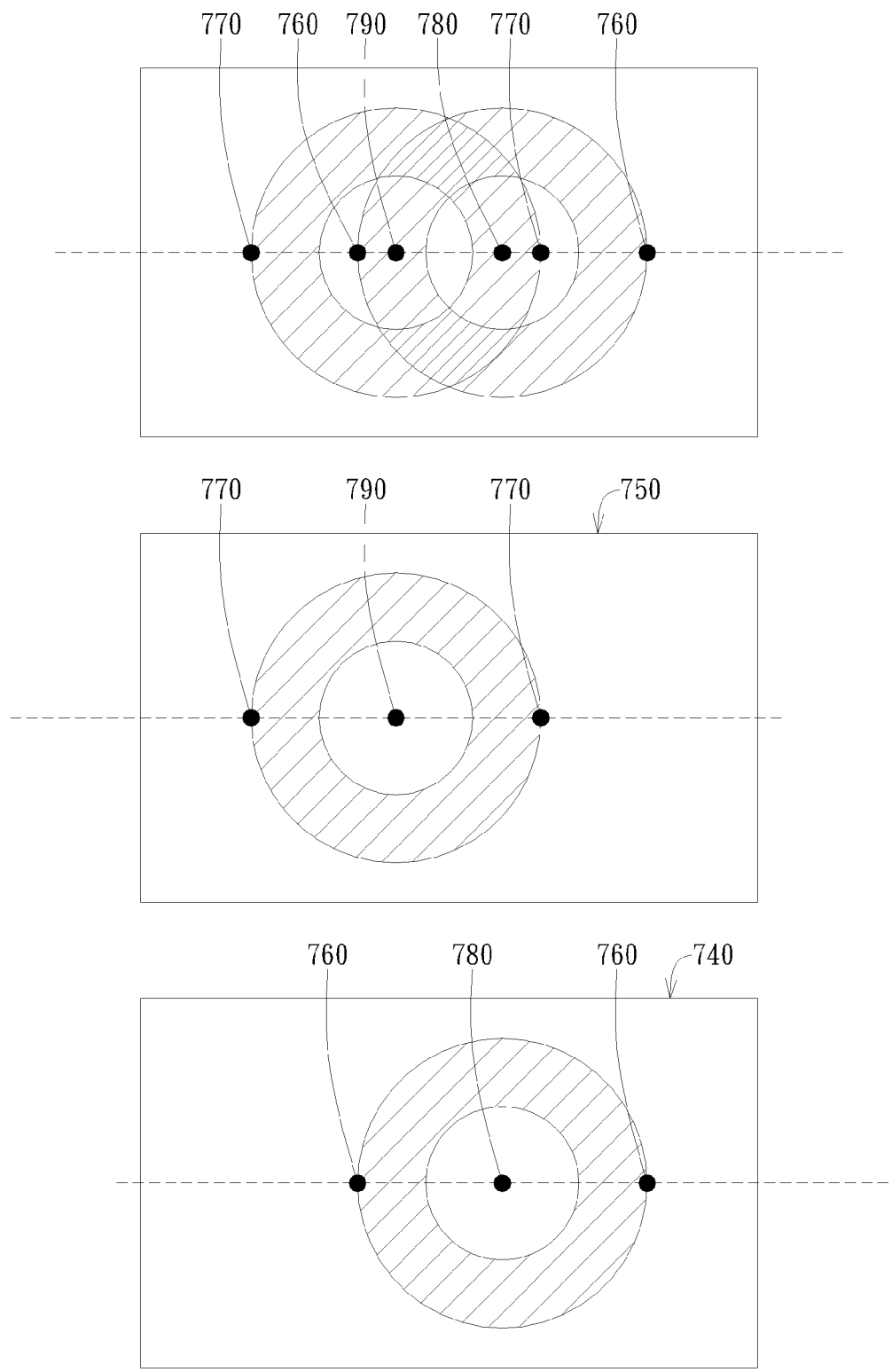
FIG. 9 illustrates the algorithm used by the synchronization signal generator in FIG. 8A to generate the original synchronization signal.

FIG. 9 illustrates the algorithm used by the synchronization signal generator 270 in FIG. 8A to generate the original synchronization signal L/R. In the present embodiment, upon receiving the three-dimensional image signal D, the synchronization signal generator 270 cannot identify the left-eye-image signal 740 and the right-eye-image signal 750 included in the three-dimensional image signal D. The following algorithm is applied to distinguish the left eye image 740 from the right eye image 750.

The synchronization signal generator 270 performs the edge detection on the left eye image 740 and the right eye image 750, respectively. Firstly, the synchronization signal generator 270 defines an edge threshold, wherein the edge threshold is a predetermined difference in luminous intensity between two adjacent points. The synchronization signal generator 270 then performs the edge detection from two ends of a horizontal line toward the center of the left-eye-image signal 740 or the right-eye-image signal 750. As FIG. 9 shows, the synchronization signal generator 270 will obtain two first edge points 760 at two sides of the left-eye-image signal 740. The synchronization signal generator 270 calculates a first center 780 based on locations of two first edge points 760. Similarly, in the embodiment illustrated in FIG. 9, the synchronization signal generator 270 will obtain two second edge points 770 and calculate a second center 790 based on locations of two second edge points 770.

After obtaining the first center 780 and the second center 790, the synchronization signal generator 270 will compare locations of the two centers and then determine the image corresponding to each of the centers 780, 790 as a left eye image or a right eye image. In the present embodiment, the image corresponding to the first center 780 near the right side of FIG. 9 is defined as the left eye image 740. On the other hand, the image corresponding to the second center 790 on the left side of FIG. 9 is defined as the right eye image. After determining the timing of the left-eye-image signal and the timing of the right-eye-image signal, the synchronization signal generator 270 then generates the original synchronization signal L/R, based on the result mentioned above, so that the coding module 230 can proceed to generate the modulated synchronization signal 600L/600R. In different embodiments, the synchronization signal generator 270 can use other methods to distinguish the left-eye-image signal from the right-eye-image signal.

Furthermore, in the embodiment illustrated in FIG. 9, the synchronization signal generator 270 defines the first center 780 as a center point between two first edge points 760, but is not limited thereto. In different embodiments, the synchronization signal generator 270 firstly averages the luminous intensity of two first edge points 760 to obtain an average value and then defines the location of the first center 780 based on the average value. Similarly, the synchronization signal generator 270 can also average the luminous intensity of two second edge points 770 and use the averaged value to define the location of the second center 790.

Figure 10A:
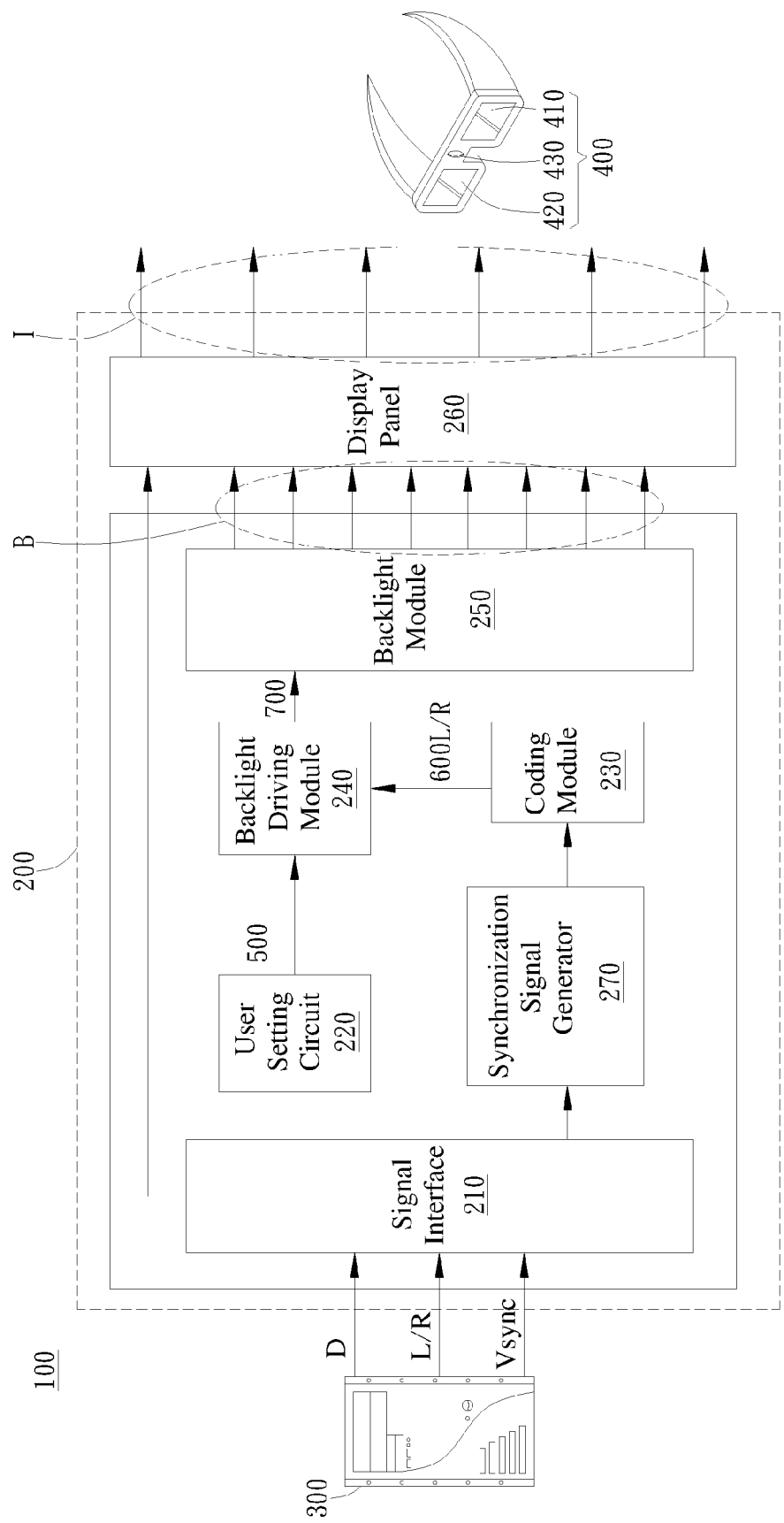
FIG. 10A is another variation embodiment of the three-dimensional display system illustrated in FIG. 2A.

FIG. 10A illustrates a variation embodiment of the display 200 in FIG. 2A. In the present embodiment, the synchronization signal generator 270 has a predetermined threshold value for determining whether the synchronization signal generator 270 is required to generate the original synchronization signal L/R based on the three-dimensional image signal D. In other embodiments, the synchronization signal generator 270 selectively generates the original synchronization signal L/R based on the signal source and the amplitude of the original synchronization signal L/R.

When the amplitude of original synchronization signal L/R is greater than the predetermined value, the synchronization signal generator 270 transmits the original synchronization signal L/R to the coding module 230 and the backlight driving module 240 to generate the modulated backlight driving signal 700 for driving the backlight module 250. However, when the amplitude of the original synchronization signal L/R is smaller than the predetermined value, the synchronization signal generator 270 will employ the method mentioned above to generate the original synchronization signal L/R based on the three-dimensional image signal D.

Figure 10B:
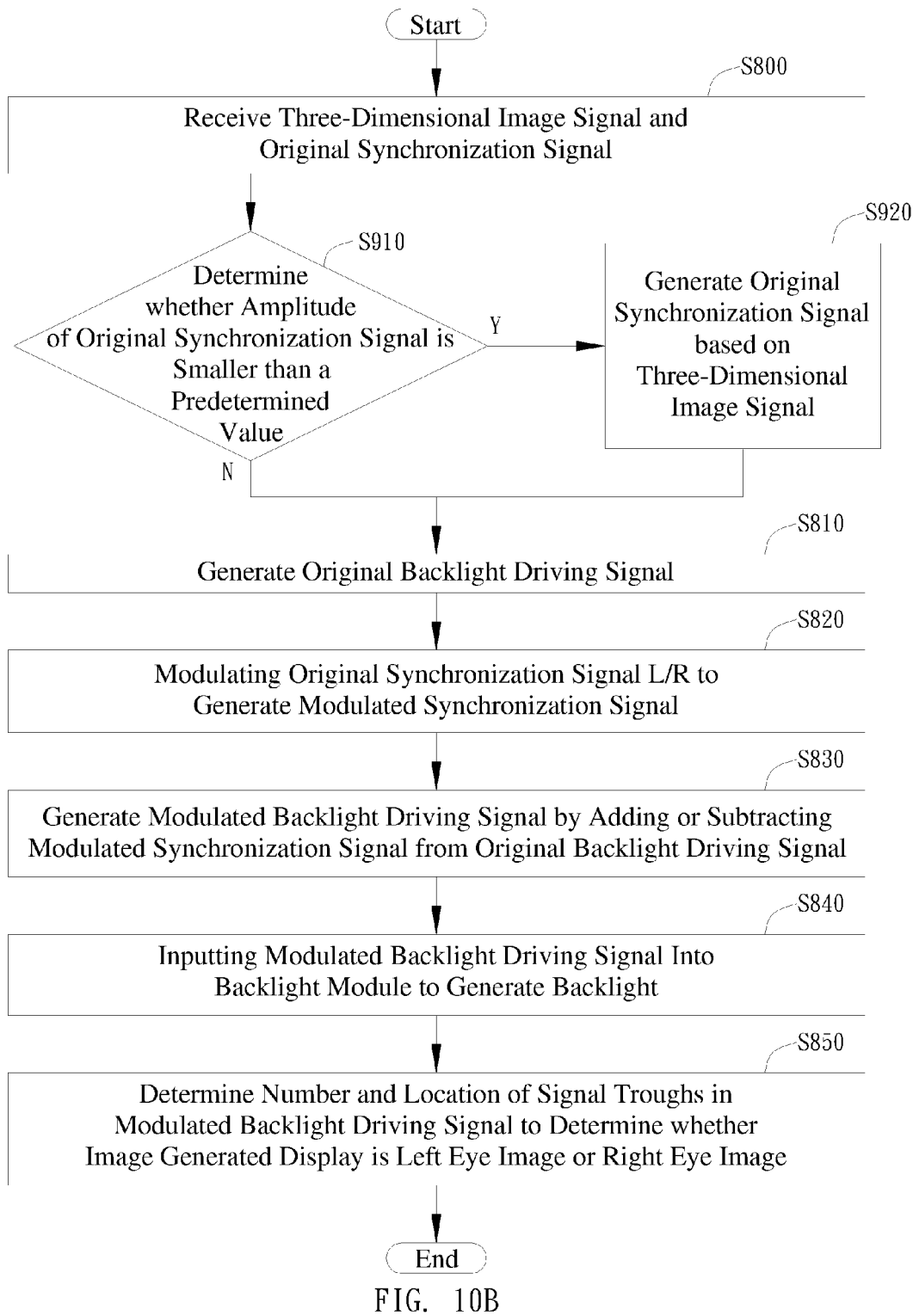
FIG. 10B is a flow chart illustrating the method of controlling the backlight module of the three-dimensional display illustrated in 10A.

FIG. 10B is a flow chart illustrating a variation embodiment of the method of controlling the backlight module of the three-dimensional display in FIG. 2B. In the present embodiment, the method further includes step S910 of determining whether the amplitude of the original synchronization signal L/R is smaller than a predetermined value, i.e. determining whether the original synchronization signal L/R actually exists. In other words, step S910 aims at determining whether the display 200 receives only the three-dimensional image signal D and the vertical synchronization signal Vsync from the computer 300. If the display 200 receives the original synchronization signal L/R in amplitude greater than the predetermined value, the method will execute step S810 directly. On the other hand, if the original synchronization signal L/R is smaller than a predetermined value, then the display 200 will determine whether the original synchronization signal L/R exists or not and selectively activate the synchronization signal generator 270 to generate the original synchronization signal L/R based on the left-eye-image signal and the right-eye-image signal in the three-dimensional image signal D.

In the embodiment illustrated in FIG. 10B, step S920 includes determining the timing of the left-eye-image signal and the right-eye-image signal using the edge detection method described above and generating the original synchronization signal L/R for the coding module 230 to generate the modulated synchronization signal 600 L/R, but is not limited thereto. In different embodiments, step S920 can use other image processing methods to distinguish the timing of the left-eye-image signal from the timing of the right-eye-image signal for generating the original synchronization signal L/R. Other than the method to generate the original synchronization signal L/R based on the three-dimensional image signal D, the method illustrated in FIG. 10B is substantially identical to the method illustrated in FIG. 10B and thus will not be further elaborated here.

The above is a detailed description of the particular embodiment of the invention which is not intended to limit the invention to the embodiment described. It is recognized that modifications within the scope of the invention will occur to a person skilled in the art. Such modifications and equivalents of the invention are intended for inclusion within the scope of this invention.

What is claimed is:

1. A display for receiving a three-dimensional image signal and an original synchronization signal corresponding to a display period of the three-dimensional image signal, the display comprising:
a user setting circuit for generating an original backlight driving signal based on a user input;
a backlight driving module, electrically connected to the user setting circuit, for modulating the original backlight driving signal according to the original synchronization signal to generate a modulated backlight driving signal; and
a backlight module, electrically connected to the backlight driving module, for generating a backlight based on the modulated backlight driving signal in the display period of the three-dimensional image signal, wherein a brightness of the backlight varies in accordance with a variation of the modulated backlight driving signal, and wherein a variation in the brightness of the backlight is provided to determine whether a left-eye-image signal or a right-eye image signal of the three-dimensional image signal is displayed by the display.

2. The display of claim 1, further comprising a coding module for generating a modulated synchronization signal based on the original synchronization signal, the backlight driving module adds the modulated synchronization signal to the original backlight driving signal to generate the modulated backlight driving signal.

3. The display of claim 2, wherein the modulated synchronization signal includes at least one pulse signal, the pulse signal includes a predetermined width, the original backlight driving signal is a direct current signal having a predetermined current in the display period of the three-dimensional image signal, the backlight driving module processes so that the direct current signal subtracts the pulse signal so that the modulated backlight driving signal includes at least one signal trough lower than the predetermined current and with a width substantially equal to the predetermined width of the pulse signal.

4. The display of claim 2, wherein the modulated synchronization signal includes at least one short pulse signal having a predetermined width, the original backlight driving signal is a long pulse signal in the display period of the three-dimensional image signal, the long pulse signal has a predetermined width and a predetermined current, the predetermined width of the long pulse signal is greater than the predetermined width of the short pulse signal, the backlight driving module processes so that the long pulse signal subtracts the short pulse signal so that the modulated backlight driving signal has at least one signal trough lower than the predetermined current and with a width substantially equal to the predetermined width of the short pulse signal in the display period of three-dimensional image signal.

5. The display of claim 3, wherein the modulated backlight driving signal has x number of signal troughs lower than the predetermined current and with widths substantially equal to the predetermined width of the pulse signal in a portion of the display period corresponding to the left-eye-image signal, the modulated backlight driving signal has y number of signal troughs lower than the predetermined current and with widths substantially equal to the predetermined width of the pulse signal in a portion of the display period corresponding to the right-eye-image signal, x is different from y.

6. The display of claim 5, further comprising a sensor, disposed at a user end, for detecting the variation in the brightness of the backlight, the sensor detecting backlight brightness corresponding to an x or y number of signal troughs to determine whether the left-eye-image signal or the right-eye-image signal is displayed by the display.

7. The display of claim 3, wherein the modulated backlight driving signal includes a signal trough lower than the predetermined current and with a width substantially equal to the predetermined width of the pulse signal in a first time slot of the display period of the three-dimensional image signal corresponding to the left-eye-image signal, the modulated backlight driving signal includes a signal trough lower than the predetermined current and with a width substantially equal to the predetermined width of the pulse signal in a second time slot of the display period of the three-dimensional image signal corresponding to the right-eye-image signal, the first time slot and the second time slot are different.

8. The display of claim 7, further comprising a sensor disposed at a user end, for detecting the variation in the brightness of the backlight, the sensor detecting backlight brightness corresponding to the signal trough at a location of the first time slot or the second time slot to determine whether the left-eye-image signal or the right-eye-image signal is displayed by the display.

9. The display of claim 2, further comprising a synchronization signal generator, electrically connected to the coding module, for transmitting the synchronization signal to the coding module, wherein the synchronization signal generator divides the three-dimensional image signal into a plurality of left-eye-image signals and a plurality of right-eye-image signals when a current value of the original synchronization signal received by the coding module is smaller than a predetermined current value, the synchronization signal generator then generates the synchronization signal based on a sequence of the left-eye-image signals and the right-eye-image signals.

10. A method for controlling a backlight module of a display, the display includes an user setting circuit, a backlight driving module, and the backlight module, the method comprising the following steps:
the display receiving a three-dimensional image signal and an original synchronization signal;
the user setting circuit generating an original backlight driving signal based on a user input;
the backlight driving module modulating the original backlight driving signal based on the original synchronization signal to generate a modulated backlight driving signal; and
the backlight module generating a backlight based on the modulated backlight driving signal in a display period of the three-dimensional image signal, wherein a brightness of the backlight varies in accordance with a variation of the modulated backlight driving signal, and wherein a variation in the brightness of the backlight is provided to determine whether a left-eye-image signal or a right-eye-image signal of the three-dimensional image signal is displayed by the display.

11. The method of claim 10, wherein the display further includes a coding module for modulating the original synchronization signal to generate a modulated synchronization signal having at least one pulse signal, the pulse signal having a predetermined width, the original backlight driving signal is a direct current signal having a predetermined current in the display period of the three-dimensional image signal, the method includes the following steps:
adding the modulated synchronization signal to the original backlight driving signal to generate the modulated backlight driving signal; and
generating the backlight having at least one brightness corresponding to a signal trough lower than the predetermined current and with a width substantially equal to the predetermined width of the plus signal.

12. The method of claim 11, wherein the display further includes a sensor electrically connected to a user glasses, the three-dimensional image signal includes the left-eye-image signal following with the generated brightness corresponding to an x number of the signal troughs and the right-eye-image signal following with the generated brightness corresponding to an y number of the signal troughs, the method includes: calculating the x or y number of the signal troughs in the generated brightness by the sensor to determine whether the left-eye-image signal or the right-eye-image signal is displayed by the display.

13. A display for receiving a three-dimensional image signal, the display comprising:
a user setting circuit for generating an original backlight driving signal based on a user input;
a synchronization signal generator for dividing the three-dimensional image signal into a plurality of left-eye-image signals and a plurality of right-eye-image signals and generating a synchronization signal based on a sequence of the left-eye-image signal and the right-eye-image signal;
a backlight driving module electrically connected to the user setting circuit, the backlight driving module modulating the original backlight driving signal according to the original synchronization signal to generate a modulated backlight driving signal; and
a backlight module electrically connected to the backlight driving module, the backlight module generating a backlight based on the modulated backlight driving signal in the display period of the three-dimensional image signal, wherein a brightness of the backlight varies in accordance with a variation of the modulated backlight driving signal, and wherein a variation in the brightness of the backlight is provided to determine whether the left-eye-image signal or the right-eye-image signal is displayed by the display.

14. The display of claim 13, further comprising a coding module for generating a modulated synchronization signal based on the original synchronization signal, the backlight driving module adds the modulated synchronization signal to the original backlight driving signal to generate the modulated backlight driving signal.

15. The display of claim 14, wherein the modulated synchronization signal includes at least one pulse signal, the pulse signal includes a predetermined width, the original backlight driving signal is a direct current signal having a predetermined current in the display period of the three-dimensional image signal, the backlight driving module processes that the direct current signal subtracts the pulse signal so that the modulated backlight driving signal includes at least one signal trough lower than the predetermined current and with a width of the predetermined width of the plus signal.

16. The display of claim 14, wherein the modulated synchronization signal has at least one short pulse signal, the short pulse signal has a predetermined width, the original backlight driving signal is a long pulse signal in the display period of the three-dimensional image signal and has a predetermined width and a predetermined current, the predetermined width of the long plus signal is greater than the predetermined width of the short plus signal, the backlight driving module processes so that the long pulse signal subtracts the short pulse signal so that the modulated backlight driving signal has at least one signal trough lower than the predetermined current and with a width substantially equal to the predetermined width of the short plus signal in the display period of the three-dimensional image signal.

17. The display of claim 15, wherein the modulated backlight driving signal has x number of signal troughs lower than the predetermined current and with widths substantially equal to the predetermined width of the plus signal in a portion of the display period corresponding to the left-eye-image signal, the modulated backlight driving signal has y number of signal troughs lower than the predetermined current and with widths substantially equal to the predetermined width of the plus signal in a portion of the display period corresponding to the right-eye-image signal whereas x is different from y.

18. The display of claim 17, further comprising a sensor disposed at a user end, the sensor detecting the variation in the brightness of the backlight, the sensor detecting the x or y number of the signal troughs in the brightness to determine whether the left-eye-image signal or the right-eye-image signal is displayed by the display.

19. The display of claim 15, wherein the modulated backlight driving signal includes a signal trough lower than the predetermined current and with a width substantially equal to the predetermined width of the pulse signal in a first time slot of the display period of the three-dimensional image signal corresponding to the left-eye-image signal, the modulated backlight driving signal includes a signal trough lower than the predetermined current and having a width substantially equal to the predetermined width of the pulse signal in a second time slot of the display period of the three-dimensional image signal corresponding to the right-eye-image signal, wherein the first time slot and the second time slot are different.

20. The display of claim 19, further comprising a sensor disposed at a user end, for detecting the variation in the brightness of the backlight, the sensor detecting backlight brightness corresponding to the signal trough at a location of the first time slot or the second time slot within the display period of the three-dimensional image signal to determine whether the left-eye-image signal or the right-eye-image signal is displayed by the display.

* * * * *